(No Model.)
J. JOHNSON.
DEVICE FOR CLEANING AND SEPARATING PEANUTS.
No. 293,332. Patented Feb. 12, 1884.
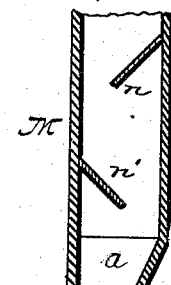
Fig. 1.
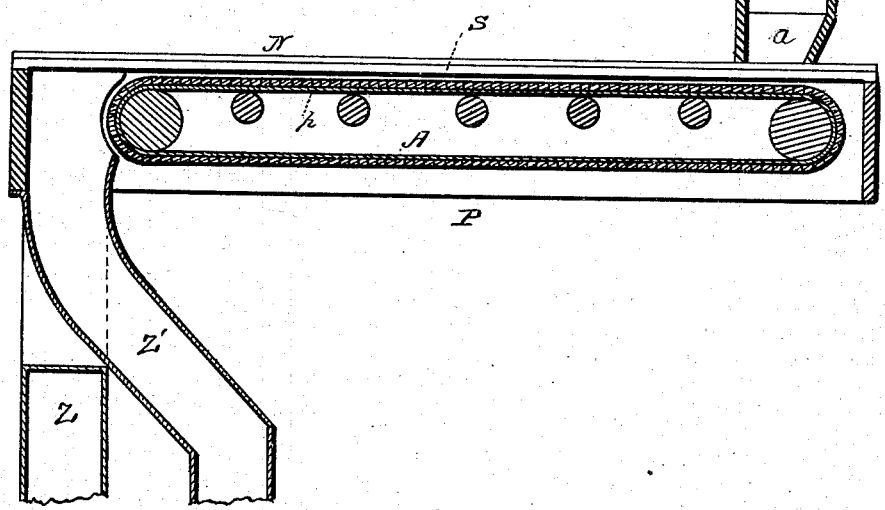
Fig. 2.
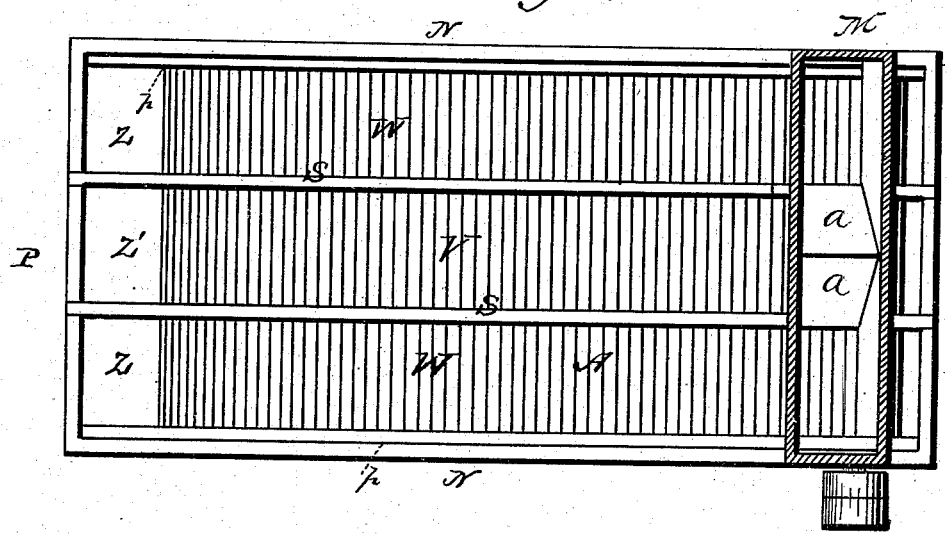
WITNESSES
E. H. Bates
Philip E. Masi
INVENTOR
Josie Johnson
by Anderson & Smith
his ATTORNEYS

UNITED STATES PATENT OFFICE.

JOSEE JOHNSON, OF NORFOLK, VIRGINIA, ASSIGNOR, BY MESNE ASSIGNMENTS, TO THE NORFOLK STORAGE COMPANY, OF SAME PLACE.

DEVICE FOR CLEANING AND SEPARATING PEANUTS.

SPECIFICATION forming part of Letters Patent No. 293,332, dated February 12, 1884.

Application filed April 14, 1883. (No model.)

*To all whom it may concern:*

Be it known that I, JOSEE JOHNSON, a citizen of the United States, residing at Norfolk, in the county of Norfolk and State of Virginia, have invented certain new and useful Improvements in Devices for Cleaning and Separating Peanuts; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view, and Fig. 2 is a top view.

This invention has relation to improvements in horizontal carriers or separators for assorting nuts, beans, &c.; and it consists in the construction and novel arrangement of parts, as will be hereinafter more fully set forth, and particularly pointed out in the claims appended.

In the accompanying drawings, M designates a chute, which may be employed to deliver the nuts to the traveling apron or carrier. This chute, if long enough to require it, should be provided with oblique check-boards $n$, to prevent the nuts from falling too rapidly. When such check-boards are used, the lower check-board, $n'$, should be directed backward, so that the nuts will be fed upon the apron in a gentle and uniform manner without scattering.

The apron or endless carrier A is preferably formed of transverse slats secured to endless bands, said slats having their ends arranged to travel in ways $p$ of the sides N of a supporting-frame, P. The frame is provided with two partitions, S, subdividing its surface into compartments W and V, which extend longitudinally or in the direction of motion of the carrier. The partitions S are fixed, being a part of the framing P, and the carrier moves along underneath the partitions in close proximity thereto. At the end of the carrier or apron are the discharge-chutes Z and Z', which are arranged, respectively, at the ends of the compartments W and V. The chutes Z and Z' are independent of each other, and receive, respectively, the nuts discharged at the ends of the compartment-ways W and V, conveying the same downward into the bags, sacks, or other receptacles provided therefor. The nuts are delivered upon the outer compartments, W, of the carrier. This is effected by means of the deflectors $a$, arranged in the chute M over the central compartment, V, the said plates meeting at their upper ends and diverging downwardly, so as to direct the nuts into the outer compartments, W. The picking-hands, whose office is to separate the different kinds or different grades of nuts, stand at the sides and end of the carrier, and select from the nuts passing in the outer compartments those which are to be separated therefrom, casting the same into the compartment V, to be carried to the end of the table and discharged into the chute Z'.

Having described this invention, what I claim, and desire to secure by Letters Patent, is—

1. The combination of the frame, the endless apron, the partitions dividing the belt into a series of compartments, the feed-chute, the deflectors in said chute to direct matter into a portion of the compartments and exclude it from the other, and separate discharge-chutes for said compartments, substantially as described.

2. The combination of the frame provided with ways along its sides, the endless apron traveling in the ways of the frame, the longitudinal partitions dividing the apron into a series of compartments, the feed-chute provided with the deflectors to direct matter into a portion of said compartments and exclude it from the others, and the separate discharge-chutes to said compartments, substantially as described.

In testimony whereof I affix my signature in presence of two witnesses.

JOSEE JOHNSON.

Witnesses:
G. H. FREY,
DAVIES VELLINES.